March 18, 1952
J. B. KILLIAN
2,589,554
SAW GUIDE FOR PORTABLE POWER-DRIVEN
HAND-OPERATED CIRCULAR SAWS
Filed June 11, 1948
2 SHEETS—SHEET 1
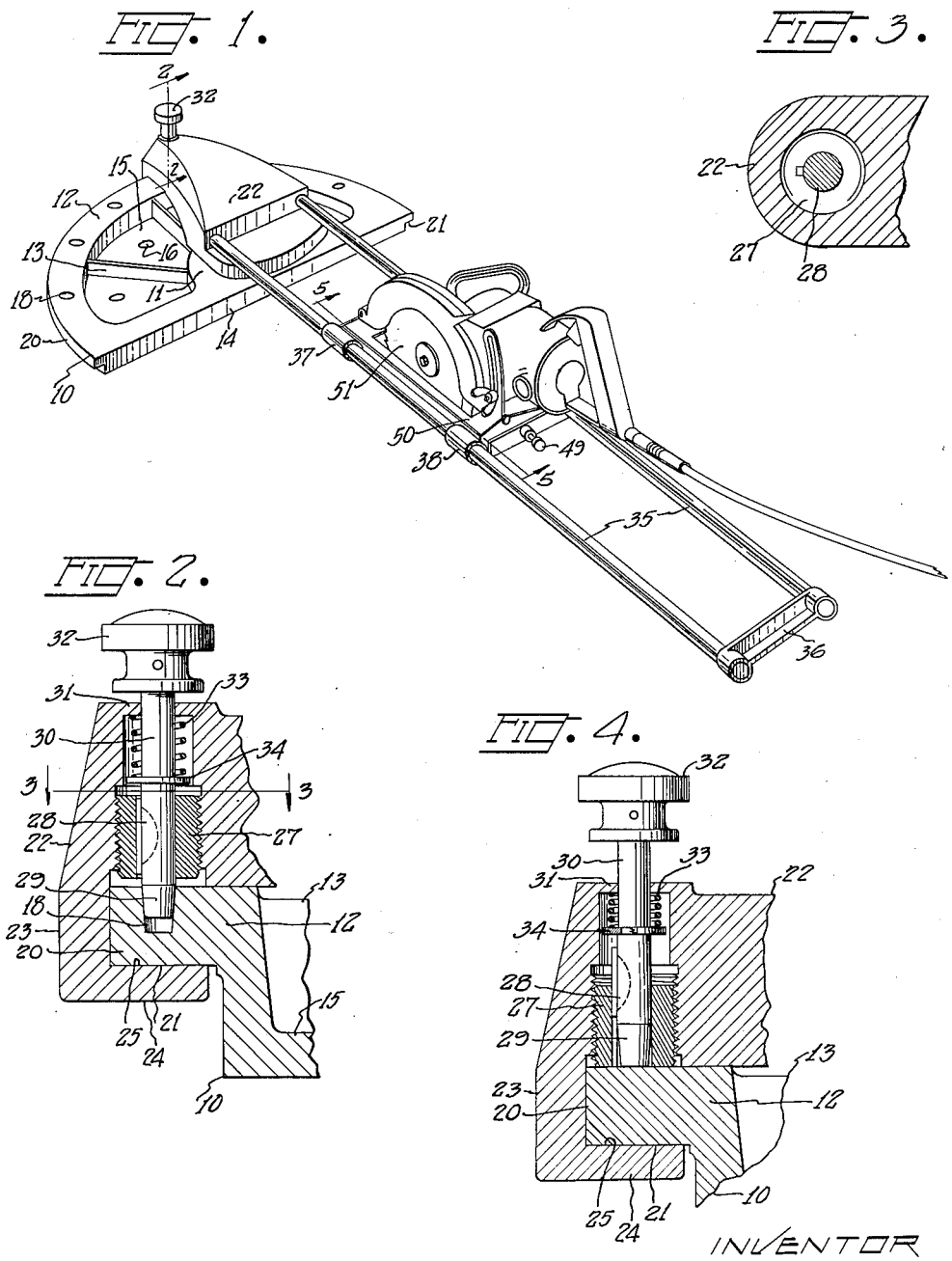
INVENTOR
JENNINGS B. KILLIAN
BY
E. B. Birkenbeul
ATTORNEY March 18, 1952   J. B. KILLIAN   2,589,554
SAW GUIDE FOR PORTABLE POWER-DRIVEN
HAND-OPERATED CIRCULAR SAWS
Filed June 11, 1948   2 SHEETS—SHEET 2
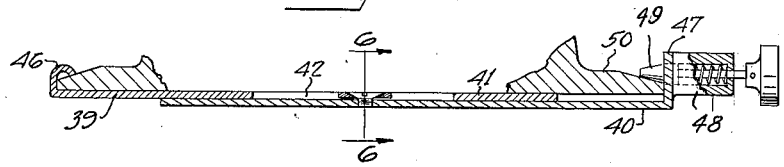
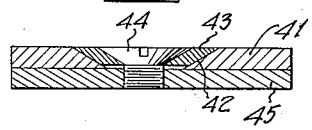
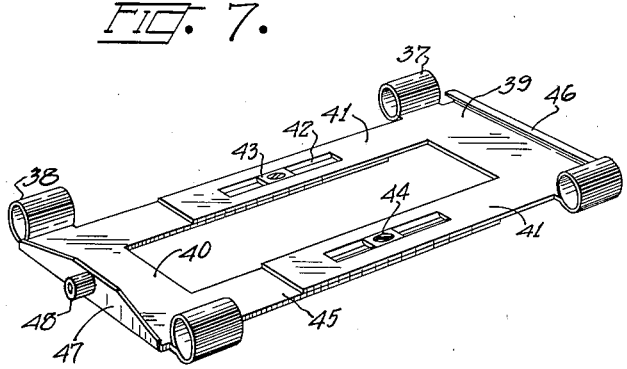
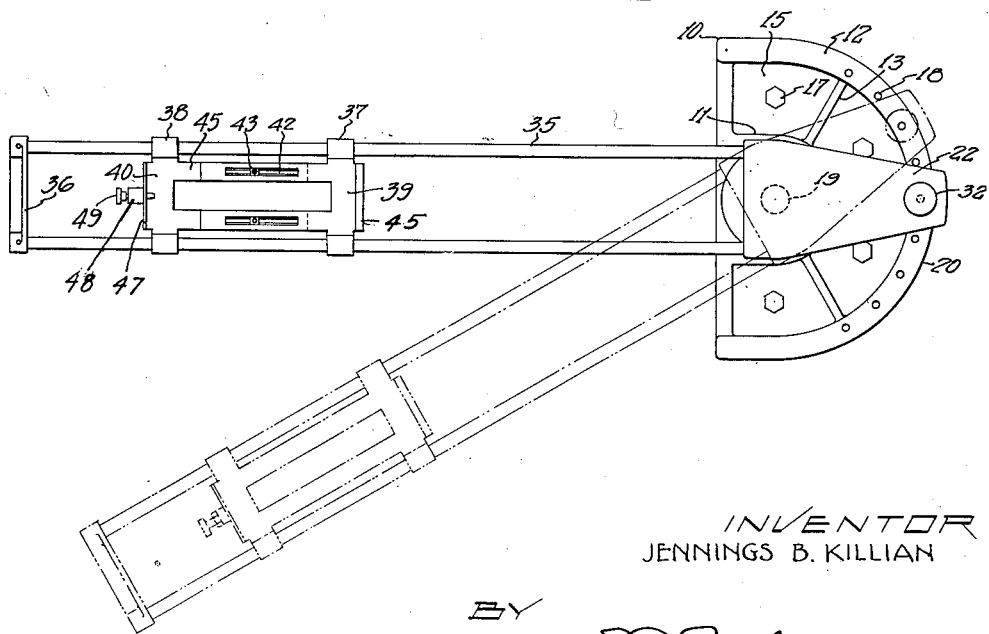
INVENTOR
JENNINGS B. KILLIAN
BY
ATTORNEY Patented Mar. 18, 1952

2,589,554

UNITED STATES PATENT OFFICE 2,589,554

SAW GUIDE FOR PORTABLE POWER-DRIVEN HAND-OPERATED CIRCULAR SAWS

Jennings B. Killian, Portland, Oreg.

Application June 11, 1948, Serial No. 32,368

3 Claims. (Cl. 143—6)

This invention relates generally to woodworking machinery and particularly to a saw guide.

The main object of this invention is to provide a means whereby precision cuts may be made in wood at any desired angle.

The second object is to provide a device for this purpose which will be easy to manufacture, light in weight and having the parts made in shapes and sizes which adapt them for reproduction by die casting methods.

These and other advantages will become more apparent from the specification following as illustrated in the accompanying drawings, in which:

Fig. 1 is a perspective view showing a power saw in place thereon.

Fig. 2 is a section taken along the line 2—2 in Fig. 1.

Fig. 3 is a section taken along the line 3—3 in Fig. 2, showing the device in an indexed position.

Fig. 4 is a view similar to Fig. 2, but showing the device clamped in an intermediate position.

Fig. 5 is a fragmentary section taken along the line 5—5 in Fig. 1.

Fig. 6 is a section taken along the line 6—6 in Fig. 5.

Fig. 7 is a perspective view of the slide.

Fig. 8 is a plan of the guide without the saw.

Like numbers of reference refer to the same or similar parts throughout the several views.

Referring in detail to the drawings, there is shown a semi-circular base 10 having a heavy central hub 11 and rim 12 which are joined by the spokes 13.

The straight front edge 14 is tied to the rim 12 and spokes 13 by the web 15 which contacts the bench or other support (not shown) upon which the device is mounted. Holes 16 are provided in the web 15 for the hold down bolts 17.

Tapering index holes 18 are formed in the rim 12 to conform to those angles commonly used by builders and wood-working mechanics. A pivot pin 19 is mounted in the hub 11 and forms the center of an arc along which the holes 18 are located and also for the semi-circular edge 20. All, or a portion, of the edge 20 is undercut to form a clamping surface 21.

On the top of the base 10 is mounted a head 22 which is rotatable on the pin 19. The head 22 has a downwardly extending flange 23 to which is integral with a keeper plate 24 whose top surface 25 engages the surface 21.

In the head 22 is loosely threaded a clamping bushing 27 having a spline slot therein, through which slidably passes the splined shank 28 of the tapering index pin 29 whose stem 30 is slidable in the top 31 of the head 22. A button 32 is secured on the stem 30 for lifting and turning purposes.

A spring 33 is placed around the stem 30 between the top 31 and the washer 34 which is disposed in a groove on the upper end of the shank 28. With this arrangement, it is possible to index the device by means of the pin 29 and holes 18, or to clamp it in an intermediate position by turning the button 32 and through it the bushing 27 until it clamps down upon the top of the rim 12, making it possible to hold the guide in any desirable position.

Mounted in the head 22 are the parallel guide rods 35 which are joined at their ends by the handle member 36.

Mounted on the guide rods 35 are tubular members 37 and 38 which are parts of the U-shaped saw frames 39 and 40. The portion 41 of the frame member 39 is provided with bevelled slots 42 into which fits a shoe 43, through which a screw 44 passes and is threaded into the frame sides 45.

The frame 39 is provided with a backwardly turned flange 46 on its top side and the frame 40 has an upturned flange 47 on which is mounted a boss 48 which holds a spring-urged plunger 49.

In Fig. 5 is clearly shown the manner in which the base 50 of a power saw 51 is held between the flange 46 and the point of the plunger 49.

The over-lapping members 41 and 45 permit large adjustments for various saw base sizes, while the plunger 49 does the clamping.

It can be seen from the foregoing that an exceedingly simple and convenient form of saw guide is hereby provided.

I claim:

1. A saw guide having a base for mounting the guide on a bench, said base having a semi-circular flange on the rear side thereof, a head pivotally mounted on the center of said semi-circular base, said base having index holes formed along said flange, an index pin mounted in said head having a spring for urging said pin downwardly and a threaded bushing supporting said pin and adapted to be rotated by said pin and to slidably receive same, the lower end of said bushing engaging the top of said flange when turned by said pin, and a guide supported by said head upon which a power saw can slide.

2. In a saw guide, the combination of a semi-circular base perforated around its semi-circular edge, having a head revolvably mounted thereon, an index pin mounted in said head adapted to engage the various holes in said base, said pin having a threaded bushing mounted in said head and splined to said pin, said bushing resting on said base when said bushing is turned to hold said head against movement with relation to said base.

3. In a device of the class described, the combination of a base adapted to be mounted on the top of a bench, said base having a semi-circular flange spaced from the bottom thereof, a head pivotally mounted on said base, said flange having a row of index holes formed therein around the semi-circular edge, an index pin in said head having a spring for urging said pin into said holes, said pin having a spline, a threaded bushing mounted in said head having a spline slot adapted to slidably receive said spline, a button on said pin for lifting and turning said pin and a pair of guide rods extending horizontally and in parallelism from said head, a saw frame slidably mounted on said rods and means for holding a power saw on said frame.

JENNINGS B. KILLIAN.

REFERENCES CITED

The following references are of record in the file of this patent:

UNITED STATES PATENTS

| Number | Name | Date |
| --- | --- | --- |
| 506,090 | Beimling | Oct. 3, 1893 |
| 1,706,115 | Hannah | Mar. 19, 1929 |
| 1,832,283 | Earhart | Nov. 17, 1931 |
| 2,356,610 | Penney | Aug. 22, 1944 |